United States Patent [19]

Kaiser

[11] 4,093,920
[45] June 6, 1978

[54] DELAYED RESPONSE TRANSMITTER INDICATOR

[76] Inventor: Martin L. Kaiser, 115 Bosley Ave., Cockeysville, Md. 21030

[21] Appl. No.: 700,919

[22] Filed: Jun. 29, 1976

[51] Int. Cl.$^2$ ............................................. H04B 1/06
[52] U.S. Cl. ...................................... 325/364; 325/64
[58] Field of Search ................. 325/64, 67, 363, 364, 325/398, 449; 340/416, 224, 258 B, 258 D; 343/5 PD, 703, 830, 894; 330/10; 324/47

[56] References Cited

U.S. PATENT DOCUMENTS

| 2,512,078 | 6/1950 | Wehner | 343/830 |
| 3,256,515 | 6/1966 | Caprio | 325/364 |
| 3,613,010 | 10/1971 | Podolski et al. | 325/364 |
| 3,634,768 | 1/1972 | Carpenter et al. | 325/449 |

Primary Examiner—Robert L. Griffin
Assistant Examiner—Marc E. Bookbinder
Attorney, Agent, or Firm—J. Wesley Everett

[57] ABSTRACT

A broad band wave detection system which responds to no signal versus any signal with a resettable indicator which responds only after a pre-determined period of time. The system has a crystal detector coupled to a chopper, an AC amplifier, a detector which is coupled to a level detector and a time delay to actuate an indicator driver to produce a visual or aural signal. The system indicates the presence of an RF signal which has remained constant for a pre-set period of time and resets to zero time on removal of the RF signal.

2 Claims, 1 Drawing Figure

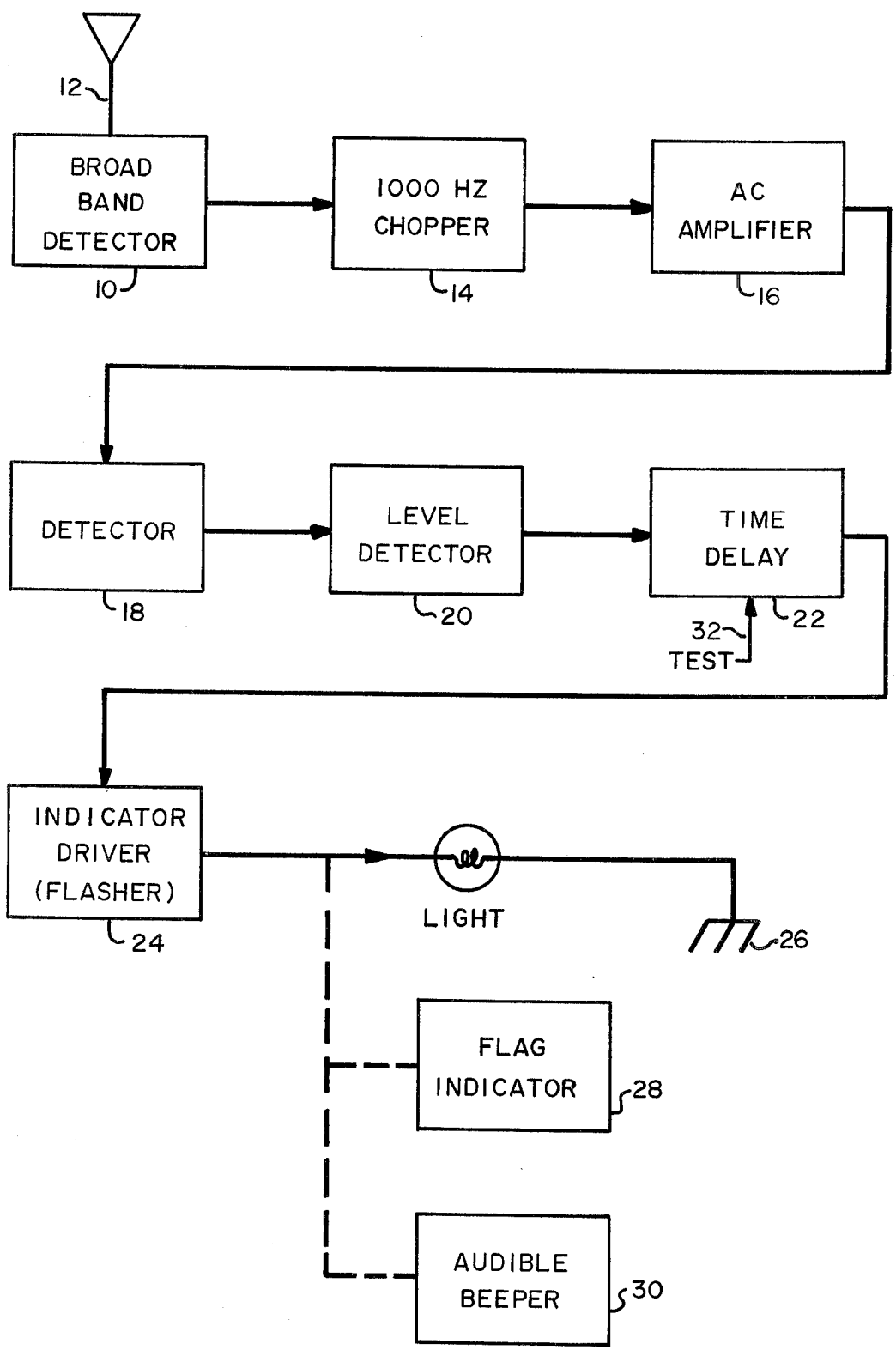

DELAYED RESPONSE TRANSMITTER INDICATOR

The present invention relates to search-assist apparatus and has particular reference to that type of apparatus which is employed to assist or otherwise guide a searcher to the location of a lost object as, for example, a downed airplane.

During the past decade, the Federal Aviation Administration has maintained in effect a detailed regulation which makes it mandatory for all commercial aircraft to be equipped with a miniature emergency locator transmitter, commonly referred to as "ELT". The function of such an ELT is to become automatically energized or triggered when a severe impact is encountered and, when thus energized, to commence the transmission of an emergency signal, usually a continuous-type signal. With the transmitter thus energized and operating, the location of the downed aircraft may be readily determined by well-known triangulation techniques, utilizing conventional radio direction-finding equipment to accelerate the rescue search.

While the basis for the mandatory use of such an emergency locator transmitter in connection with aircraft is highly commendable, and while the system is invariably operable in the case of an actual aircraft crash, the system is nonetheless subject to certain limitations principal among which is the inability of the transmitter to distinguish, insofar as its triggering action is concerned, between an actual crash landing and a reasonably hard landing, or, under certain circumstances, a condition of rough airborne turbulence. Actually, reports recently released by the Federal Aviation Administration have shown that the ratio of inadvertent transmitter triggering as related to actual crash triggering is on the order of 99%.

As a result of the aforementioned "false alarm" rate, a condition of almost total apathy has arisen among aircraft personnel, particularly pilots. Federal laws making it mandatory for each pilot to be personally responsible for his ELT are, at this time, non-existent. There are indications that even a stiff law will not provide the incentive for the pilot to act. There are also many situations where communicating pilots either inadvertently lock their microphones on, have their microphones malfunction, or place the microphone in such a position that it is held on (such as sitting on the microphone). When this event occurs, it totally blankets an active communication channel which generally has no alternate. The pilot is preoccupied with other matters so that a simple transmitter indicating light is of little use.

The present invention is designed to overcome the above noted limitations that are attendant upon the construction and use of present day mandatory emergency locator transmitters and, toward this end, the invention contemplates the provision of a transmitter detection system which requires only extremely low standby and operation current so that it may be wired directly to the aircraft battery in such a manner that it will be operable at all times regardless of the setting of the master electrical system circuit breakers. The system requires continuous transmission for a predetermined period of from 30 to 60 seconds before it will cause the indicator flag, light or audible beeper to function and it also incorporates an instantaneous reset so that its timing cycle begins anew each time the transmitter is energized for keyed on purpose. Such time delay is sufficient so that the alarm which it renders will not demand attention until after the time delay is exceeded. At that time it is then the pilot's responsibility to determine the source of the transmission and respond accordingly. The system is designed so that it may be operatively associated with radio transmitters which currently are being produced by various manufacturers.

I am aware of search-assist apparatus of the general type shown and described in the U.S. Pat. No. 3,613,010, granted Oct. 21, 1971 and entitled "Continuous Wave Presence Detection Circuit," wherein a continuous wave signal in the presence of other signals carrying modulation components may be detected but which disregards signals carrying any form of modulation whatsoever. In the patented system, the threshold circuit is set in the presence of existing signals and responds to additional signals. In contrast to this, the present system is designed to respond to no signal whatsoever versus any signal, and the delay, in tens of seconds, responds only after a pre-determined period of time. In addition, there is incorporated an instantaneous reset of the delay period when transmission ceases.

The provision of an apparatus such as has briefly been outlined above and possessing the stated advantages constitutes the principal object of the present invention.

Numerous other objects and advantages of the invention, not at this time enumerated, will readily become apparent as the nature of the invention is better understood.

In the accompanying single sheet of drawings forming a part of this specification, the single FIGURE is a block diagram, entirely schematic in its representation, of a preferred embodiment of the invention.

Referring now to the drawings in detail, the broad band detector 10 includes an LRC peaked crystal detector tuned to 121.5 MHz and capable of detecting transmitters operating both on and around 121.5 MHz and 243 MHz. The broad band detector 10 is coupled with a ¼ wave 243 MHz antenna 12 to insure the detection of both low and high frequency aircraft bands. The output of detector 10 is alternately shorted (chopped) to ground through the 1000 Hz chopper 14 to form an alternating current signal proportional amplitude to the incoming radio frequency (RF) energy, which is amplified by the high gain AC amplifier 16 and then detected by the detector 18.

The detector 18 produces a DC signal which is also proportional in amplitude to the incoming RF signal and the DC signal is applied to the level detector 20 connected to the time delay 22. When no DC signal is present, the level detector holds the time delay circuit 22 at zero. When an input DC signal occurs, the level detector 20 allows the time delay circuit 22 to trigger and begin the timing process. If there is a continuous RF source being picked up by the antenna 12, the time delay circuit 22 will, in the prescribed time, actuate the indicator driver 24, which may include a flasher, to actuate optionally physical indicators such as the light 26, the flag indicator 28 and the audible beeper 30.

If at any time during the initial time delay imposed by the time delay 22, the RF signal at the antenna 12 is interrupted, the level detector immediately pulls the time delay 22 to zero, thereby restarting the delay process. The time delay circuit 22 includes a test function 32 which permits immediate indication of an RF signal for test purposes. The level detector 20, the time delay 22, the indicator driver 24 as well as the light 26, the flag indicator 28 and the audible beeper 30 may also be wired directly into existing communication equipment.

While only one form of the invention has been described in detail, it is not intended as a limitation as the scope of the invention is best defined by the appended claims:

I claim:

1. A system for detecting the presence of radio frequency energy comprising: means for detecting modulated RF energy from a downed aircraft emergency locator transmitter including;
   a. a broad band detector including an LRC peaked crystal detector tuned to 121.5 MHz and secondarily resonant at 243 MHz to receive a modulated RF input;
   b. a chopper amplifier fed by said crystal detector including a 1000 Hz chopper and a high gain AC amplifier to produce an AC signal proportional to the RF input; a detector connected to said AC amplifier, said detector being adapted to produce a DC signal proportional in amplitude to the RF input;
   c. a level detector fed by said AC amplifier and detector;
   d. a time delay fed by said level detector, whereby the absence of a DC signal from the detector causes the level detector to activate the time delay to zero time and when an RF input occurs the level detector triggers the time delay and the timing process begins;
   e. an indicator driver fed by said time delay; and
   f. indicator means for detecting the output of said indicator driver, said output representing the presence of an RF input.

2. A system for detecting the presence of radio frequency energy in accordance with claim 1 in which: said indicator means for detecting the output of an indicator driver includes a physical indicator.

* * * * *